US008744766B2

(12) United States Patent
Rakshit

(10) Patent No.: US 8,744,766 B2
(45) Date of Patent: Jun. 3, 2014

(54) DYNAMIC ROUTE RECOMMENDATION BASED ON POLLUTION DATA

(75) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 13/245,918

(22) Filed: Sep. 27, 2011

(65) Prior Publication Data

US 2013/0080053 A1  Mar. 28, 2013

(51) Int. Cl.
*G01C 21/00* (2006.01)

(52) U.S. Cl.
USPC .......................................... 701/527; 340/632

(58) Field of Classification Search
USPC .......................................... 701/527; 340/632
See application file for complete search history.

(56) References Cited

U.S. PATENT DOCUMENTS

| 6,028,553 | A | 2/2000 | Oberstein |
| 8,352,179 | B2 * | 1/2013 | French et al. ................. 701/410 |
| 8,364,395 | B2 * | 1/2013 | French et al. ................. 701/410 |
| 2002/0177945 | A1 | 11/2002 | Davies |
| 2004/0039517 | A1 | 2/2004 | Biesinger et al. |
| 2009/0309744 | A1 | 12/2009 | Fu et al. |
| 2010/0106603 | A1 | 4/2010 | Dey et al. |
| 2010/0145569 | A1 | 6/2010 | Bourque et al. |
| 2010/0211304 | A1 | 8/2010 | Hwang et al. |
| 2013/0144527 | A1 * | 6/2013 | Kuhnreichi ........................ 702/2 |

FOREIGN PATENT DOCUMENTS

| EP | 0814448 A2 | 12/1997 |
| EP | 0814448 A3 | 1/1998 |
| KR | 1020100085682 A1 * | 7/2010 | ............... H04B 1/40 |
| KR | 101048267 B1 * | 7/2011 | ............... H04B 1/40 |
| WO | 2010139249 A1 | 12/2010 |
| WO | WO02013054310 A1 * | 4/2013 | ............. G01C 21/34 |

OTHER PUBLICATIONS

Casalegno et al. "White Paper on Sustainable Transportation." MIT Mobile Experience Laboratory and Cisco Systems, Inc./Connected Urban Development. Sep. 11, 2008. <http://www.connectedurbandevelopment.org/pdf/sust_trans/sustainable_transportation.pdf>.

Hedgecock et al. "Dissemination and Presentation of High Resolution Air Pollution Data from Mobile Sensor Nodes" (Version 1), 2010. ACM SE 2010 Oxford, MS, USA. ACM X-XXXXX-XX-X/XX/XX. <http://www.vuse.vanderbilt.edu/~koutsoxd/www/Publications/Hedgecock-ACM-Paper%20%283%29.pdf>.

Hedgecock et al. "Dissemination and Presentation of High Resolution Air Pollution Data from Mobile Sensor Nodes" (Version 2), Apr. 15-17, 2010, ACMSE 2010, ACM 978-1-4503-0064-Mar. 10, 2004, Proceedings of the 48th Annual Southeast Regional Conference. ACM, New York, NY USA. doi>10.1145/1900008.1900019.

(Continued)

*Primary Examiner* — Mary Cheung
*Assistant Examiner* — Michael Berns
(74) *Attorney, Agent, or Firm* — Michael Petrocelli; Ronald Kaschak

(57) ABSTRACT

Aspects of the present invention recommend a route. An indication of an origin and a destination is received. Data describing a plurality of navigation routes between the origin and the destination is received. A plurality of pollution score values corresponding to each of the plurality of navigation routes is determined. A cumulative score value is determined for each of the plurality of navigation routes. The data describing the plurality of navigation routes between the origin and the destination and the corresponding plurality of pollution score values and cumulative score values is transmitted.

20 Claims, 5 Drawing Sheets

(56) References Cited

OTHER PUBLICATIONS

IBM. "Vehicle Route Planning Based on Real-Time Pollution Monitoring." IP.COM. IP.com No. IPCOM000175555D. Oct. 13, 2008.

"Closing the loop between traffic/pollution sensing and vehicle route control" (Version 1). Jan. 14, 2011. <http://sensorlab.cs.dartmouth.edu/NSFPervasiveComputingAtScale/pdf/1569392865.pdf>.

Gerla et al. "Closing the loop between traffic/pollution sensing and vehicle route control" (Version 2). NSF CPS Workshop, Mar. 17, 2011. <http://varma.ece.cmu.edu/Auto-CPS-2011/Papers/Gerla_lftode.pdf>.

Ikram et al. "Air pollution monitoring through an Internet-based network of volunteers." Environment and Urbanization. vol. 19, No. 1, pp. 225-241. Apr. 2007, published by SAGE Publications, Inc. on behalf of International Institute of Environment and Development (IIED). <http://eau.sagepub.com/content/19/1/225.full.pdf+html>.

Khedo et al. "A Wireless Sensor Network Air Pollution Monitoring System." International Journal of Wireless & Mobile Networks (IJWMN), vol. 2, No. 2, May 2010, pp. 31-45.

\* cited by examiner

DYNAMIC ROUTE RECOMMENDATION BASED ON POLLUTION DATA

FIELD OF THE INVENTION

The present invention relates generally to dynamic route recommendation between an origin and a destination, and more specifically to dynamic route recommendation based on pollution data.

BACKGROUND

Pollution of the urban environment is fast becoming a grave threat to urban dwellers as levels of toxicity increase to beyond safe limits. There are many kinds of air pollutants, and the most common and measured air pollutants are: carbon dioxide ($CO_2$), carbon monoxide (CO), sulfur dioxide ($SO_2$), nitric oxide (NO), nitrogen dioxide ($NO_2$), nitrous oxide ($N_2O$), suspended particles (PM 10 or PM 2.5), ozone ($O_3$), and the like.

There are well known options in the art for collecting environmental pollution data by means of air pollution detection devices, such as sensors. Pollution sensors may be located in static locations, or allowed to roam on an entity. For example, a plurality of air pollution detecting devices may be selectively installed in vehicles, motorbikes, bicycles, or users' portable paraphernalia, such as a helmet worn by a motorbike rider. Air pollution information of various geographic locations over a vast area is obtainable while the vehicles or the users keep moving around.

Global Positioning System (GPS) based navigation systems are known that use stored maps to do route planning based on distance, speed limits and user preference of types of roads. Such systems are capable of providing routes based upon the starting point and end destination of a user. The resulting route chosen is adequate, but not necessarily least polluted.

SUMMARY

In one aspect, a method for recommending a route is provided. The method comprises a first computer receiving an indication of an origin and a destination. The method further comprises receiving data that describes a plurality of navigation routes between the origin and the destination from a second computer. The method further comprises the first computer determining a plurality of pollution score values corresponding to each of the plurality of navigation routes. The method further comprises the first computer determining a cumulative score value for each of the plurality of navigation routes. The method further comprises the first computer transmitting the data that describes the plurality of navigation routes between the origin and the destination and the corresponding plurality of pollution score values and cumulative score values to a third computer.

In another aspect, a computer system for recommending a route is provided. The computer system comprises one or more processors, one or more computer-readable memories, and one or more computer-readable tangible storage devices. The computer system further comprises program instructions, stored on at least one of the one or more storage devices for execution by at least one of the one or more processors via at least one of the one or more memories. The program instructions comprise program instructions to receive an indication of an origin and a destination. The program instructions further comprise program instructions to receive data describing a plurality of navigation routes between the origin and the destination. The program instructions further comprise program instructions to determine a plurality of pollution score values corresponding to each of the plurality of navigation routes. The program instructions further comprise program instructions to determine a cumulative score value for each of the plurality of navigation routes. The program instructions further comprise program instructions to transmit the data describing the plurality of navigation routes between the origin and the destination and the corresponding plurality of pollution score values and cumulative score values.

In another aspect, a computer program product for recommending a route is provided. The computer program product comprises one or more computer-readable tangible storage devices. The computer program product further comprises program instructions, stored on at least one of the one or more computer-readable tangible storage devices. The program instructions comprise program instructions to receive an indication of an origin and a destination. The program instructions further comprise program instructions to receive data describing a plurality of navigation routes between the origin and the destination. The program instructions further comprise program instructions to determine a plurality of pollution score values corresponding to each of the plurality of navigation routes. The program instructions further comprise program instructions to determine a cumulative score value for each of the plurality of navigation routes. The program instructions further comprise program instructions to transmit the data describing the plurality of navigation routes between the origin and the destination and the corresponding plurality of pollution score values and cumulative score values.

DETAILED DESCRIPTION

Figure 1:
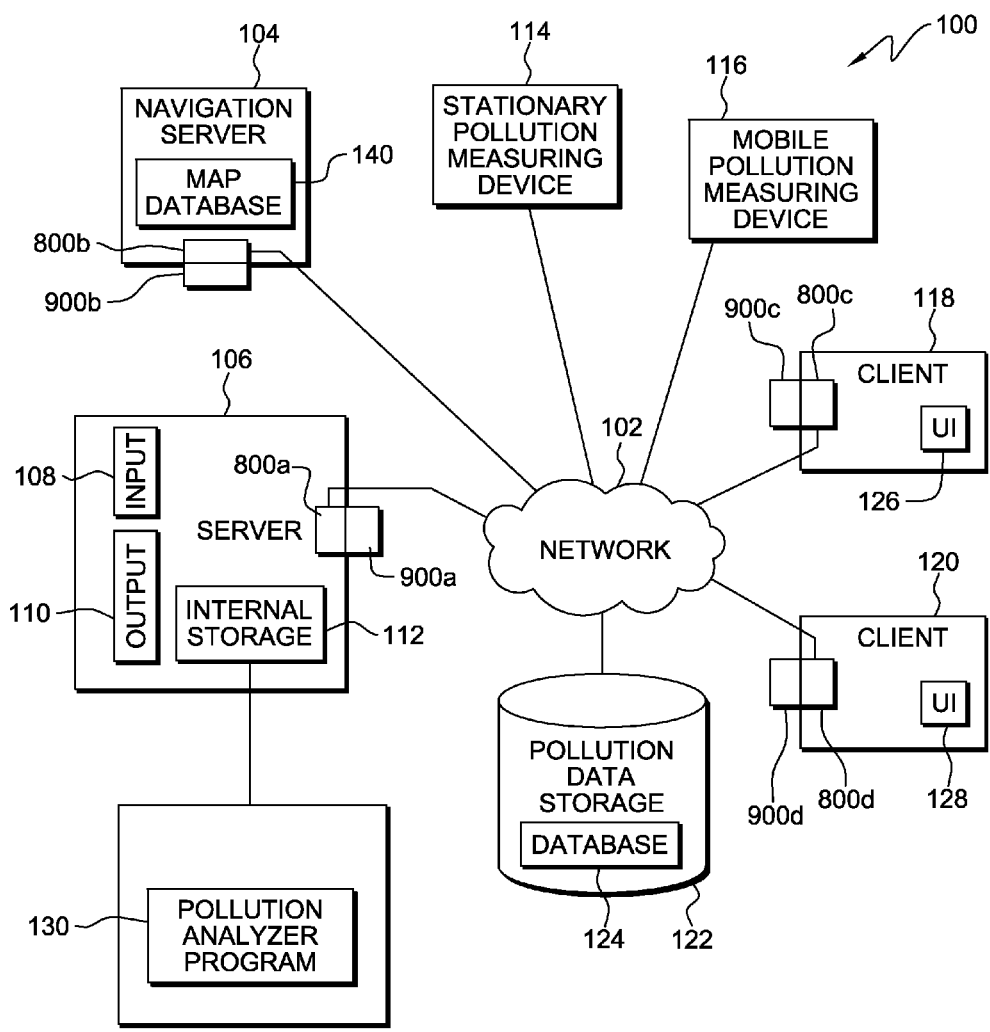
FIG. 1 is an illustration of a distributed data processing system embodying the present invention.

The present invention will now be described with reference to the figures. It should be appreciated that FIG. 1 is only provided as an illustration of one implementation and is not intended to imply any limitation with regard to the environments in which different embodiments may be implemented. Many modifications to the depicted environments may be made.

FIG. 1 illustrates a distributed data processing system generally designated 100 in accordance with one embodiment of the present invention. System 100 includes a server computer 106, a navigation server computer 104, and a pollution data storage 122. Multiple pollution measuring devices 114 and 116 are disposed at different locations throughout the area being monitored. Pollution measuring devices can be either stationary 114 or mobile 116. Preferably, the pollution measuring device 116 is allocated to a moving vehicle or paraphernalia worn by a moving human being, such as a watch, cell phone, helmet, clothing, shoes, belt, and the like. Therefore, pollution data storage unit 122 obtains pollution data while the location of the vehicle or location of the moving human being's paraphernalia is continuously changing. Preferably, if a plurality of users is equipped with pollution measuring devices and the pollution measuring devices (either mobile 116 or stationary 114) are distributed over various geographic areas, real-time pollution information of a vast geographic area is obtainable. Each pollution measuring device 114 and 116 continuously monitors pollution levels and sends pollution data, at predetermined periods of time, to pollution data storage unit 122 via a network 102 such as the Internet. Network 102 represents a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages. Of course, data processing system 100 also may be implemented as a number of different types of networks, such as an intranet, a local area network (LAN), or a wide area network (WAN).

Multiple client computers 118 and 120 are coupled to servers 104 and 106 via a network 102. Network 102 may include communication connections, such as wire, wireless communication links, or fiber optic cables.

Client computers 118 and 120 may be, for example, mobile devices, GPS navigation devices, telephones, television receivers, cell phones, personal digital assistants, netbooks, tablet computers, and/or any type of portable computing devices capable of rendering route guidance data including, navigation route data, and digital roadmap data on the display. It should be noted that in the depicted example such portable computing devices are usable with multiple vehicles, scooters, motorcycles, bicycles, public transportation, and so forth.

In the illustrated example, server computer 106 provides information, such as information computed locally or extracted from other computers on the network 102, to client computers 118 and 120. Data is communicated between server computer 106, navigation server 104 and client computers 118 and 120 using the hypertext transfer protocol (http), a protocol commonly used on the Internet to exchange information. Distributed data processing system 100 may include additional server computers, client computers, displays and other devices not shown. Client computers 118 and 120 are clients to server computer 106 in this example. Server computer 106 may contain an input device 108 and an output device 110.

Pollution analyzer program 130, included in distributed data processing system 100, may comprise program instructions stored on one or more computer-readable tangible storage devices, which may include internal storage 112 on server computer 106. Pollution analyzer program 130 sends to the navigation server 104 a route search request that includes information required in a route search, for example, a departure point (origin), a destination, and other search criteria (for example, the preference for transportation mode). A User Interface (UI) 126 on client computer 118 receives such information from a user and transmits it to pollution analyzer program 130, as discussed below.

Navigation server 104 includes a map database 140. Map database 140 is a database storing map information therein. Map information may include information about the roadway network in the geographic region. In one embodiment, the map database 140 includes node data and segment data. Node data represent physical locations in the geographic region (such as roadway intersections and other positions) and segment data represent portions of routes between the physical locations represented by nodes. Each route segment in the geographic region is represented by a route segment data entity (i.e., a record) in the map database 140. Each route segment data record in the map database 140 has two nodes which represent the coordinate positions at each end of the route segment represented by the route segment data record. (The terms "nodes" and "segments" represent only one terminology for describing these physical geographic features and other terminology for these features is intended to be encompassed within the scope of these terms.) In some embodiments, each route segment data record in the map database 140 may contain information related to that particular route segment, for example, but not limited to segment length and amount of time required by the traveler to travel the segment of the route.

Figure 3:
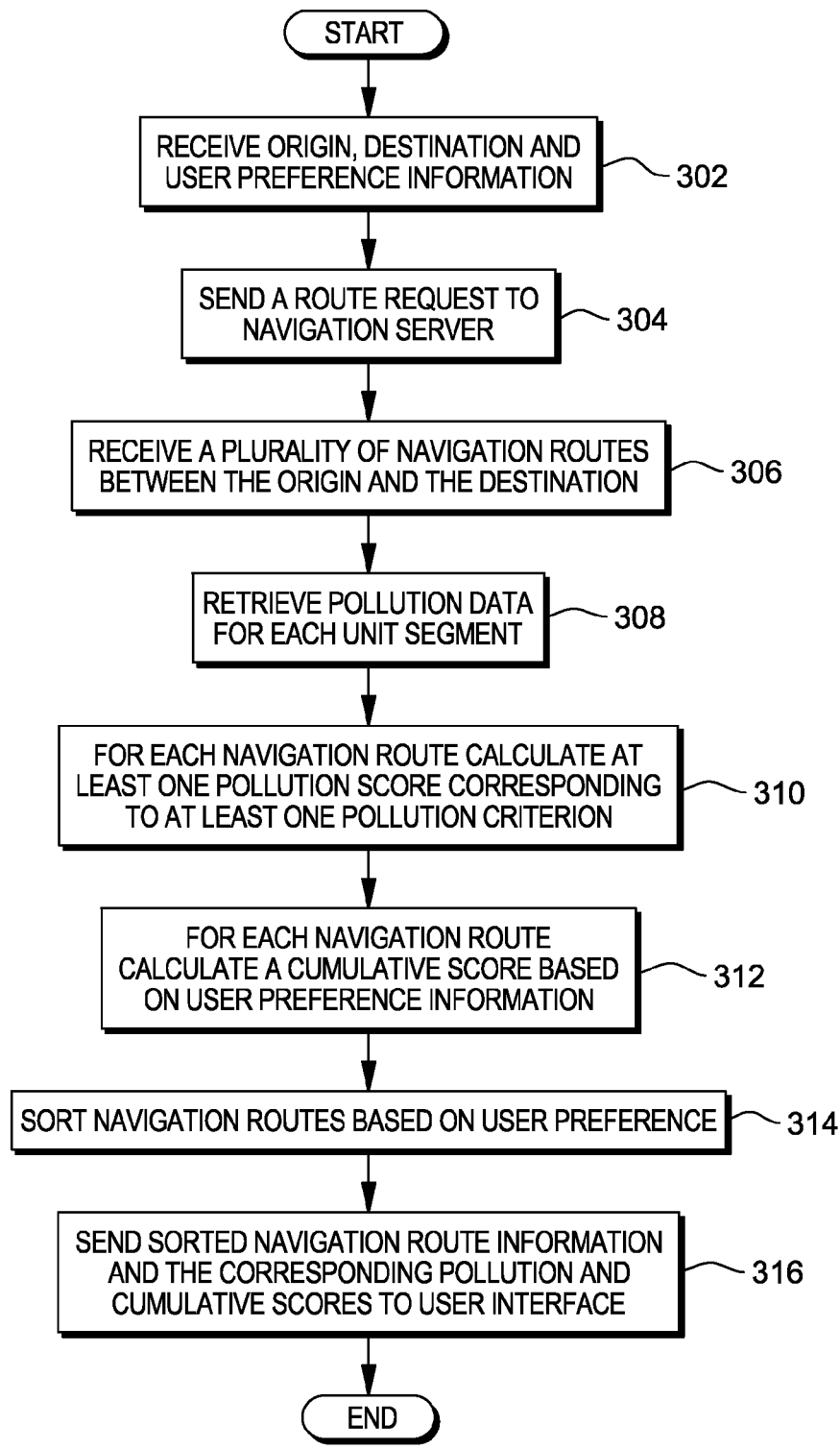
FIG. 3 illustrates in more detail the steps performed by a pollution analyzer program of the distributed data processing environment of FIG. 1 for dynamically recommending a route between the origin and the destination based on pollution data, according to one embodiment of the present invention.

Upon receiving the route search request, navigation server 104, using conventional mapping technology, identifies a plurality of routes between the origin and the destination. In various embodiments, navigation server 104 responds to the request by sending the identified plurality of routes to pollution analyzer program 130, as described below. Then, pollution analyzer program 130 retrieves pollution data corresponding to the identified plurality of routes from database 124 in pollution data storage unit 122. In addition to the air pollution information, database 124 also stores information about other pollutions, such as smog, haze, dust, noise, odor, toxic wastes, and the like. As previously indicated, a large number of pollution measuring devices 114 and 116 collect pollution information and continuously send it in real time to pollution data storage unit 122 via network 102. In various embodiments, pollution analyzer program 130 analyzes pollution information and calculates pollution scores for each of the plurality of navigation routes between the origin and the destination, as described below, and identifies one or more recommended navigation routes based on user preferences. Then pollution analyzer program 130 transmits one or more recommended navigation routes to UIs 126 and 128 on client computers 118 and 120. Subsequently, UIs 126 and 128 present information about one or more recommended navigation routes along with corresponding pollution scores to users such that the user may select a particular route. FIG. 3 illustrates in more details the steps performed by the pollution analyzer program 130, as described below.

In some embodiments pollution data storage unit 122 may be a data repository in a cloud computing environment.

Figure 2:
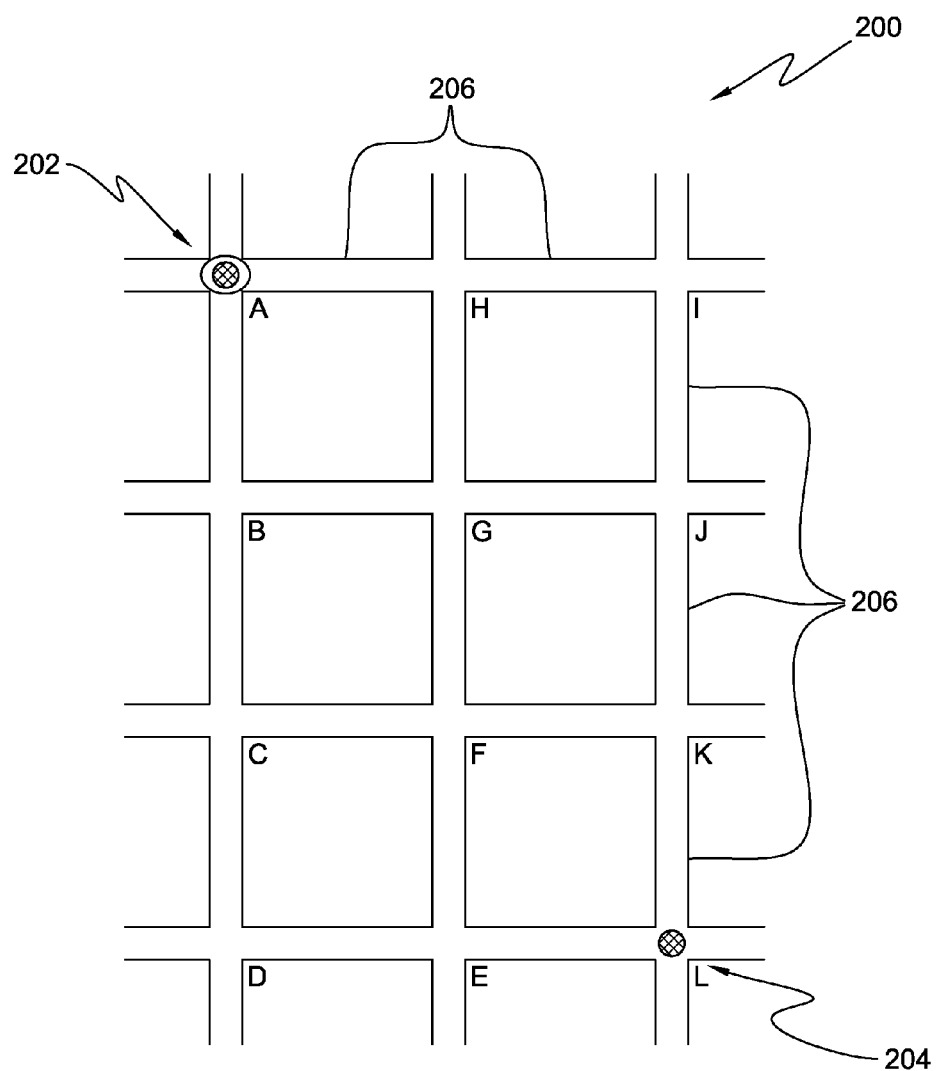
FIG. 2 is an illustrative representation of a plurality of navigation routes between an origin and a destination in a map, according to one embodiment of the present invention.

In FIG. 2, an illustrative digital road network map 200 is set forth that may be stored in the map database 140. One function of the map database 140 is to provide a road network map that is capable of being presented to a user through UIs 126 and 128. As previously disclosed, the map database 140 may also include several attributes about the route segments contained in the map such as geo-coordinates, length of segments, and the like. This information is used by the navigation server 104 to determine a plurality of routes from the trip origin 202 to the trip destination 204.

The illustrative road network map 200 includes a plurality of nodes A-L and a plurality of segments 206. The nodes A-L represent a cross point or an endpoint of a street/road and are used to represent an intersection or an end of a road. The segments 206 are used to represent a piece or stretch of a roadway between two or more nodes A-L. For the purpose of the present invention, the segments 206 may be straight segments or shaped segments.

As set forth generally above, pollution analyzer program 130 sends a route request to navigation server 104. The route request includes information about the origination location A 202 and destination L 204. Upon receiving information corresponding to point of origin 202 and destination 204, the navigation server 104 is then configured to determine a plurality of navigation routes between the origin 202 and the destination 204 by accessing map database 140 and using conventional route algorithms. Referring back to FIG. 2, the navigation server 104 may identify a plurality of candidate routes between the origin 202 and the destination 204, such as ABCDEL, AHIJKL, ABCDEFKL, ABGFKL, AHGFKL, and the like. In an embodiment, once the navigation server 104 determines this plurality of routes, it sends each of these routes to pollution analyzer program 130 as a collection of route segment data records.

FIG. 3 illustrates in more detail the steps performed by the pollution analyzer program 130 of the distributed data processing environment of FIG. 1 for dynamically recommending a route based on pollution data, according to one embodiment of the present invention. At step 302, pollution analyzer program 130 obtains origin, destination and user preference information from UI 126, as discussed below in conjunction with FIG. 4. It will be readily apparent that there are numerous ways for the user to provide the information regarding the origin location, the destination location, and user preference information. For example, the user may manually enter GPS coordinates or an address corresponding to the point of origin and/or destination. The user can enter such information through an input device selected from the group comprising a keyboard, pointing device, touch sensitive surface, speech recognition unit, and the like. The origin location 202 may be specifically specified, or may be ascertained by determining a current location for the client computer 118. Accordingly, in some embodiments, the client computer 118 is configured to determine the current location using a GPS sensor or other positioning sensor or means available to determine a location of the client computer 118. Accordingly, the client computer 118 may ascertain user's location using, for example, GPS, assisted GPS, a pedometer, inertial sensor, accelerometer, short range radio signals (e.g., WLAN signals, BLUETOOTH signal, RF, and the like), signal triangulation, and other similar techniques for determining at least an approximate location of the user. In embodiments wherein the client computer 118 is embodied as a mobile device, the client computer 118 may use the positioning sensor to determine a current location of the user. Upon receiving the information regarding the origin location 202 and the destination location 204 UI 126 sends such information to pollution analyzer program 130. In addition, pollution analyzer program 130 receives user preference information from UI 126. The user preference information can include user's preferred mode of travel (e.g., by car, by scooter, walking, bicycling, and the like) and a plurality of pollution criteria, such as, types of pollution to avoid (e.g., air pollution, noise, dust, and the like), among others.

At step 304, pollution analyzer program 130 sends a route request to navigation server 104. For example, pollution analyzer program 130 may send a request to find all navigation routes between the origin A 202 and destination L 204. Then, with regard to the routes searched by and sent from the navigation server 104 in response to the request, pollution analyzer program 130 receives a plurality of navigation routes between the origin 202 and the destination 204, at step 306. According to this embodiment, each navigation route comprises a sequence of route segments 206. For example, navigation server 104 may send the navigation route ABCFKL as a collection of data records corresponding to the following sequence of route segments 206: AB, BC, CF, FK, and KL.

Once the plurality of navigation routes has been determined, the pollution analyzer program 130 is configured to process each of the navigation routes to obtain a pollution score corresponding to each route. This can be accomplished in a variety of ways. In one embodiment, the pollution analyzer 130 is configured to process pollution data corresponding to each route. The pollution data can be obtained in a variety of ways. In one embodiment, pollution data corresponding to the various routes is stored in a database 124 on a pollution data storage unit 122. In an embodiment, pollution data may be stored in database 124 in the form of arrays with each array corresponding to one of the route segments 206. In such an embodiment, the pollution analyzer program 130 communicates with the pollution data storage unit 122 and retrieves the pollution data for each route segment 206 across the network 102 (step 308). In various embodiments pollution data may comprise either real time data or historical data.

At step 310, upon receiving the pollution data, pollution analyzer program 130 for each navigation route identified at step 306 determines a pollution score corresponding to at least one predetermined pollution criterion. In one embodiment, pollution analyzer program 130 calculates the pollution score for each candidate navigation route identified at step 306 by the following formula:

$$\sum_{i=1}^{n} (PL_i^* T_i)/D_i$$

In the formula above $PL_i$ represents the pollution level of each segment (retrieved by pollution analyzer program at step 308), $T_i$ represents an estimated amount of time required by the traveler to travel the segment, and $D_i$ represents the segment length.

The following example illustrates how pollution analyzer program calculates an air pollution score for a candidate navigation route. For illustrative purposes only, suppose that pollution analyzer program 130 at step 306 received the following information about the route segment AB from navigation server 104: D=1 kilometer and T=1 minute (by car). Furthermore, suppose that air pollution level of segment AB (obtained at step 308) is equal to 5 micrograms per cubic meter. In this case, the pollution score for segment AB=(5*1)/1=5. According to this embodiment, pollution analyzer program 130 repeats the calculation described above for each transportation mode. Transportation mode is a parameter configurable by the administrator of the pollution analyzer program 130 and it is used to define all modes of transportation for which route suggestions should be calculated. It should be noted that the pollution score for the same segment AB will be different for different modes of transportation. For example, an estimated time to walk the segment AB may be 12 minutes. Using the formula above, pollution analyzer program 130 would determine that the pollution score for segment AB when the mode of transportation is "walking" equals to 60.

Once pollution analyzer program 130 calculates pollution scores for all the segments constituting one candidate navigation route, it can calculate a pollution score of the entire candidate navigation route by summing up pollution scores of all segments.

Assume for illustrative purposes that pollution analyzer program 130 received data contained in the following table about the candidate route ABCFKL (when travelled by car):

| Segment | Length | Time | Pollution Level |
|---|---|---|---|
| AB | 1 km | 1 minute | 5 micrograms per cubic meter |
| BC | 1 km | 10 minutes | 10 micrograms per cubic meter |
| CF | 1 km | 2 minutes | 5 micrograms per cubic meter |
| FK | 1 km | 1 minute | 10 micrograms per cubic meter |
| KL | 1 km | 1 minute | 5 micrograms per cubic meter |

In this illustrative scenario, pollution analyzer program 130 would calculate the pollution score to be: (5*1/1+10*10/1+5*2/1+10*1/1+5*1/1)=130.

The example above illustrated how pollution analyzer program 130 can calculate the air pollution score for each candidate navigation route identified at step 306. In one embodiment, pollution analyzer program 130 can calculate pollution scores for various pollution criteria by substituting the corresponding pollution data ($PL_i$) into the formula. Pollution criteria is a global parameter configurable by an administrator of pollution analyzer program 130 and it is used to define all types of pollution for which pollution analyzer program 130 should calculate route suggestions.

At step 312, pollution analyzer program 130 determines a cumulative score for each navigation route based on user preference information. This can be accomplished in a variety of ways. In one embodiment, the pollution analyzer 130 determines the cumulative score for each navigation route using a weighted average of all pollution scores corresponding to that navigation route. User preference information comprises user's pre-defined selections of pollution types being desirable to avoid. In one embodiment, users may be asked to rank pollution types according to their preferences. For illustrative purposes only, assume that pollution analyzer program 130 is configured to process pollution data for the following pollution criteria: air pollution, sound pollution, and bad odor. Furthermore, assume that a user ranked pollution criteria in the same order, i.e., air pollution is the most desirable to avoid, followed by the sound pollution. The manner in which pollution analyzer program 130 determines the cumulative score is by assigning a value of 3 to the pollution score corresponding to the highest ranked pollution type (air pollution), 2 to the next highest ranked pollution type (sound pollution), and 1 to the lowest ranked pollution type. These values represent weighting factors used by the pollution analyzer program 130 when determining the cumulative score. Assume for illustrative purposes that pollution analyzer program 130 at step 310 determined the following pollution scores for the candidate route ABGFKL: air pollution score=10, sound pollution score=10, and bad odor score=10. In this illustrative embodiment, pollution analyzer program 130 would calculate cumulative pollution score value to be: (3*10+2*10+1*10)/3=20. At step 312, pollution analyzer program 130 determines cumulative pollution score values for all candidate routes in the manner described above herein.

Figure 4:
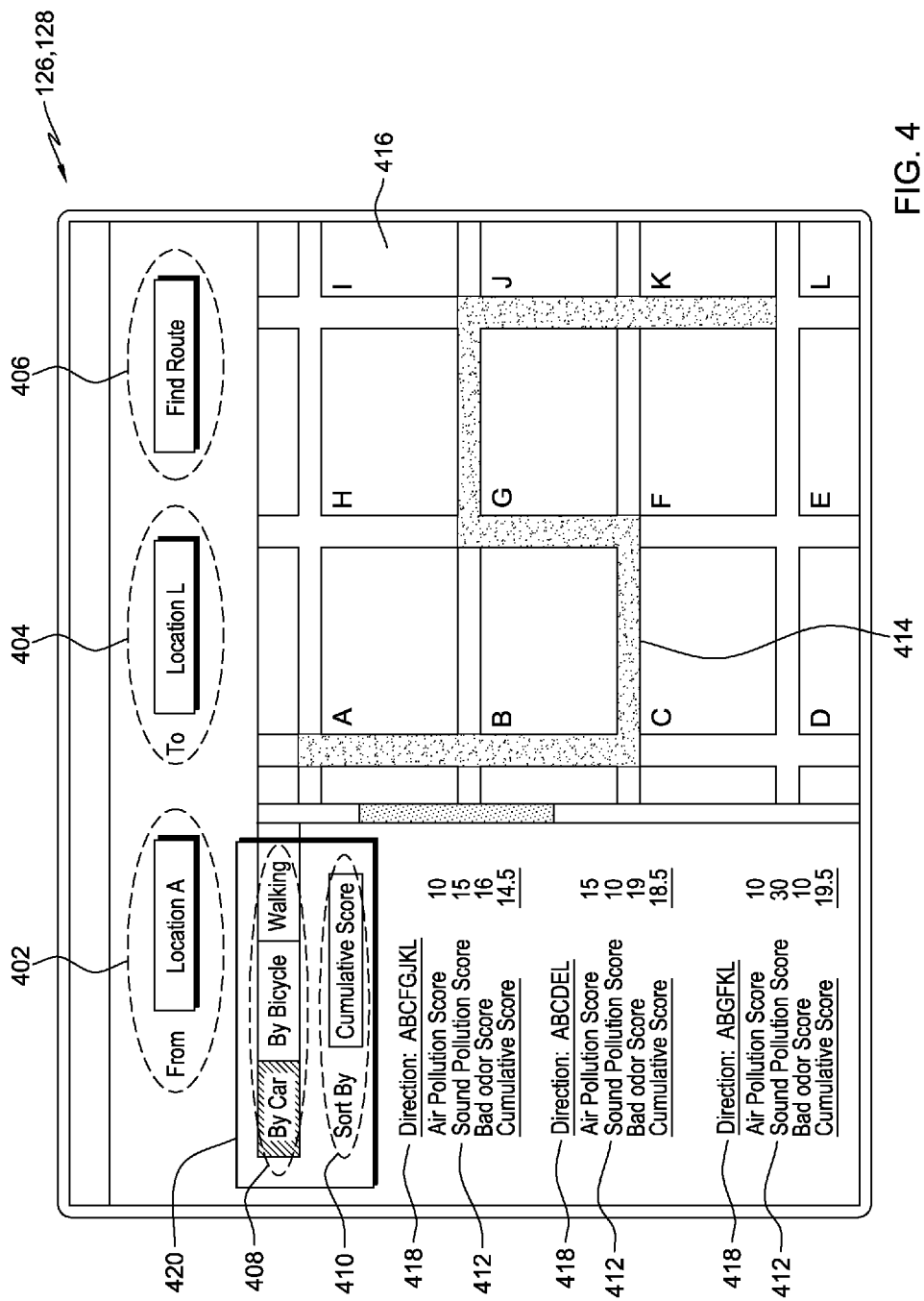
FIG. 4 illustrates an exemplary graphical user interface for presenting to a user the plurality of navigation routes between the origin and the destination and a plurality of pollution scores corresponding to each of the plurality of navigation routes, according to one embodiment of the present invention.

Once pollution analyzer program 130 determines cumulative pollution scores corresponding to all identified candidate navigation routes, at step 314, pollution analyzer program 130 sorts the order of the plurality of navigation routes based upon user defined sorting criteria. For example, a user might be interested in reviewing candidate navigation routes sorted by cumulative pollution scores. In this case, pollution analyzer program 130 sorts the candidate navigation routes based upon their corresponding cumulative pollution scores (as shown in FIG. 4). Alternatively, a user might desire to review a list of candidate navigation routes sorted by, for example, air pollution score. In this case, pollution analyzer program 130 sorts the order of the plurality of candidate navigation routes based upon their corresponding air pollution scores. It should be noted that UI 126 is configured to provide users an opportunity to enter their preferred sorting criteria, as discussed below in conjunction with FIG. 4.

At step 316, pollution analyzer program 130 transmits a sorted list of candidate navigation routes along with a plurality of corresponding pollution scores and cumulative pollution scores to UI 126. Subsequently, UI 126 presents a plurality of navigation routes with pollution scores corresponding thereto to the user. The presentation of multiple routes allows the user to make a route selection considering real-time pollution situation, as discussed further below in conjunction with FIG. 4.

Turning now to FIG. 4, illustrated therein is an exemplary UI 126,128 that may be presented to a user wishing to obtain suggested navigation route between an origin and a destination based upon dynamic pollution data. The UI 126 includes a destination name field 404 that enables a user to identify a destination for which route information is to be provided. In one embodiment, the user can specify a trip destination by writing the place name or address in the destination field 404. Alternatively, the user can specify GPS coordinates of the trip destination.

The UI 126 also includes an origin address field 402 that enables a user to identify an origin or starting address for which the route recommendation is to be provided. In one embodiment, the user may manually enter GPS coordinates or an address corresponding to the point of origin in the origin address field 402. Alternatively, client computer 118 may include a location determination device, such as, for example, GPS receiver device that is configured to communicate with the GPS satellites, to determine a present location without user input. While the use of location determination devices is helpful in determining a current location, the use of such devices is optional.

The user can specify navigation route preferences in the preferences section 420 of the displayed page. In one embodiment, this portion presents a menu 408 of travel mode options. The user may select the desired travel mode by clicking on the corresponding menu 408 option. In this embodiment, the preferences section 420 also includes a sort order preference field 410. The sort order preference field 420 may be implemented as a drop-down menu. Using sort order preference field 420 the user can specify that route recommendations should be sorted by a particular pollution score (for example, cumulative score). In some embodiments, the preferences section 420 may also include a dialog box (not shown) that enables users to specify pollution type ranking according to their preferences, as discussed above in conjunction with FIG. 3.

When the desired preferences are indicated the user clicks the "Find Route" button 406. Once the user presses "Find Route" button 406, UI 126 sends a request to pollution analyzer program 130 to determine a plurality of navigation routes based on pollution data and user preferences. In response to this request, pollution data analyzer program 130 performs steps described above in conjunction with FIG. 3. After pollution data analyzer program 130 finishes and transmits the results to UI 126, UI 126 presents results as a sorted list of navigation routes 418 between the origin 202 and destination 204 along with a plurality of scores 412 corresponding to each navigation route 412, as determined by pollution data analyzer program 130. UI 126 presents this list sorted by the user preference indicated in the sort order preference field 410. In an embodiment, the UI 126 is configured to display a graphical presentation 416 of a map and a recommended route 414 that has been selected as a recommended choice by the UI 126 based on user-defined sorting criteria of pollution scores corresponding to a plurality of navigation routes 418. The recommended route 414 may be conveniently highlighted on the rendered map 416. In this embodiment, if users are not satisfied with the recommended route 414 they may select one or more alternative routes from the list of navigation routes 418 presented by UI 126. In one embodiment, alternative routes may be highlighted in different colors on the rendered map 416. In various embodiments, a user could also consider a different mode of transportation by clicking on one of the travel mode menu 408 options. In an embodiment, once a user selects an alternative mode of transportation, UI 126 renders pollution scores 412 corresponding to the selected mode of transportation. It should be noted that UI 126 may sort recommended routes 418 in different order because pollution scores corresponding to each navigation route 418 will differ among different modes of transportation.

Figure 5:
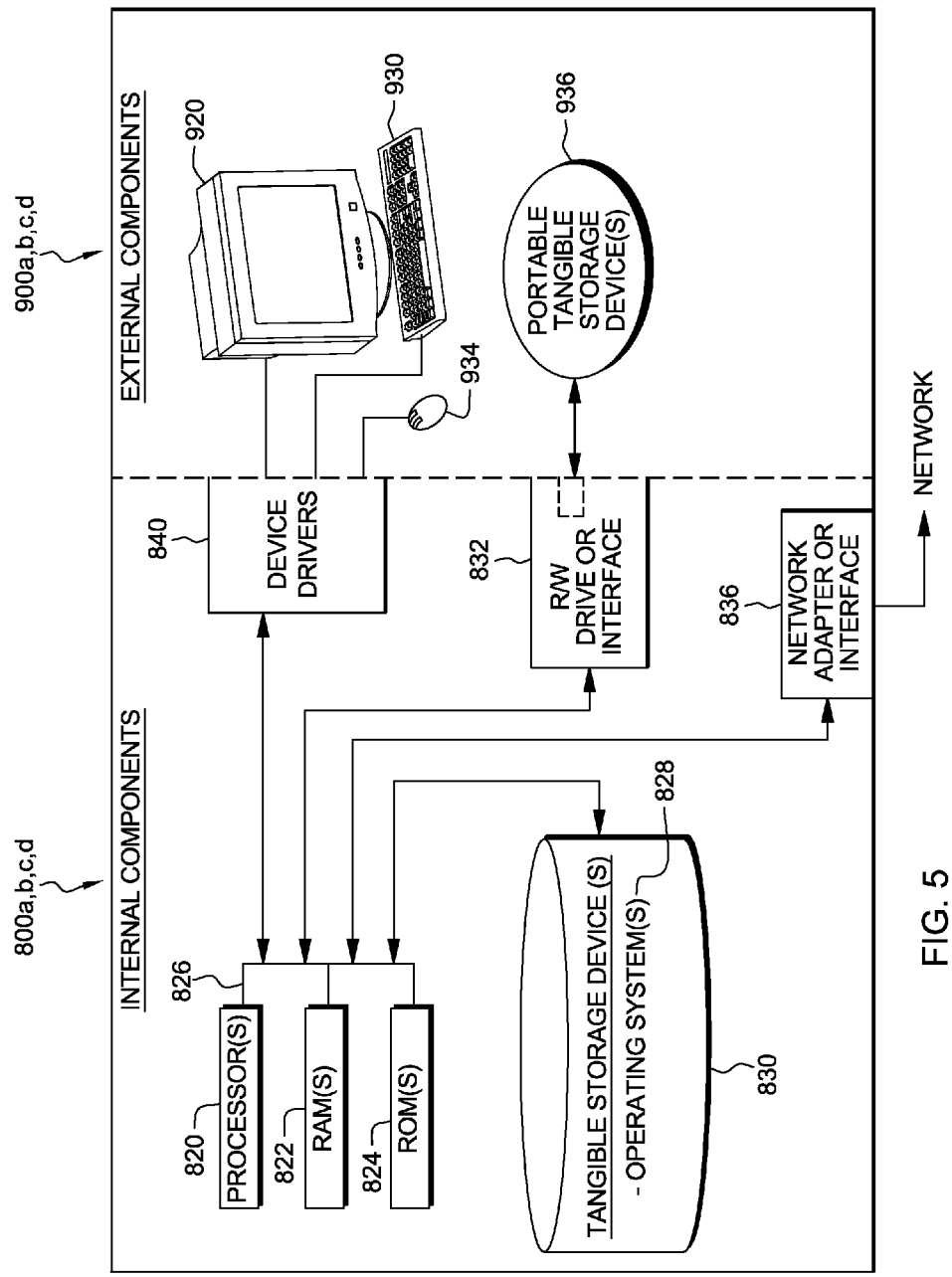
FIG. 5 is a block diagram of internal and external components of each of the computers of FIG. 1.

Computers 104, 106, 118 and 120 include respective sets of internal components 800a, b, c, d and external components 900a, b, c, d illustrated in FIG. 5. Each of the sets of internal components 800a, b, c, d includes one or more processors 820, one or more computer-readable RAMs 822 and one or more computer-readable ROMs 824 on one or more buses 826, and one or more guest operating systems 828 and one or more computer-readable tangible storage devices 830. The one or more operating systems 828 and pollution analyzer program 130 are stored on one or more of the computer-readable tangible storage devices 830 for execution by one or more of the processors 820 via one or more of the RAMs 822 (which typically include cache memory). Pollution database 124 and map database 140 are also stored on one or more computer-readable tangible storage devices 830. In the embodiment illustrated in FIG. 5 each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c, d also includes a R/W drive or interface 832 to read from and write to one or more portable computer-readable tangible storage devices 936 such as a CD-ROM, DVD, memory stick, magnetic tape, magnetic disk, optical disk or semiconductor storage device. The pollution analyzer program 130 can be stored on one or more of the portable computer-readable tangible storage devices 936, read via R/W drive or interface 832 and loaded into one or more computer-readable tangible storage devices 830.

Each set of internal components 800a, b, c, d also includes a network adapter or interface 836 such as a TCP/IP adapter card. The pollution analyzer program 132 can be downloaded to data processing system 100 from an external computer via a network (for example, the Internet, a local area network or other, wide area network) and network adapter or interface 836. From the network adapter or interface 836, the pollution analyzer program 130 is loaded into one or more computer-readable tangible storage devices 830. The network may comprise copper wires, optical fibers, wireless transmission, routers, firewalls, switches, gateway computers and/or edge servers.

Each of the sets of external components 900a, b, c, d include a computer display monitor 920, a keyboard 930, and a computer mouse 934. Each set of internal components 800a, b, c, d also includes device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Pollution analyzer program 130 can be written in various programming languages including low-level, high-level, object-oriented or non object-oriented languages. Alternatively, the functions of pollution analyzer program 130 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for recommending a route, the method comprising the steps of:
 a first computer receiving an indication of an origin and a destination;
 the first computer receiving data describing a plurality of navigation routes between the origin and the destination from a second computer;
 receiving, at the first computer, a plurality of pollution criteria including a plurality of pollution types;
 determining, using the first computer, a pollution score value for each of the pollution types based on pollution sensor data, the first computer determining a plurality of the pollution score values corresponding to each of the plurality of navigation routes;
 the first computer determining a cumulative score value for each of the plurality of navigation routes, the cumulative score values including the pollution score values for each of the plurality of pollution types; and
 the first computer transmitting the data describing the plurality of navigation routes between the origin and the destination and the corresponding plurality of pollution score values and cumulative score values to a third computer.

2. The method of claim 1, wherein the data describing the plurality of navigation routes comprises a list identifying a plurality of route segment data entities.

3. The method of claim 1, further comprising the step of the first computer receiving user preference information, wherein the received user preference information comprises a plurality of pollution criteria.

4. The method of claim 3, wherein the step of the first computer determining the plurality of pollution score values comprises the first computer determining a pollution score value for at least one predetermined pollution criterion.

5. The method of claim 1, wherein the step of the first computer determining the plurality of pollution score values comprises the first computer determining a pollution score value for at least one transportation mode.

6. The method of claim 1, wherein the step of the first computer determining the cumulative score value comprises the first computer determining a weighted average of all pollution score values corresponding to the one of the plurality of navigation routes.

7. The method of claim 1, wherein the third computer is configured to display the data describing the plurality of navigation routes between the origin and the destination and the corresponding plurality of pollution score values and cumulative score values.

8. A computer system for recommending a route, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive an indication of an origin and a destination;

program instructions to receive data describing a plurality of navigation routes between the origin and the destination;

program instructions to receive a plurality of pollution criteria including a plurality of pollution types;

program instruction to determine a pollution score value for each of the pollution types based on pollution sensor data, program instructions to determine a plurality of the pollution score values corresponding to each of the plurality of navigation routes;

program instructions to determine a cumulative score value for each of the plurality of navigation routes, the cumulative score values including the pollution score values for each of the plurality of pollution types; and program instructions to transmit the data describing the plurality of navigation routes between the origin and the destination and the corresponding plurality of pollution score values and cumulative score values.

9. The computer system of claim 8, wherein the data describing the plurality of navigation routes comprises a list identifying a plurality of route segment data entities.

10. The computer system of claim 8, further comprising program instructions to receive user preference information, wherein the user preference information comprises a plurality of pollution criteria.

11. The computer system of claim 10, wherein the program instructions to determine the plurality of pollution score values comprise program instructions to determine a pollution score value for at least one predetermined pollution criterion.

12. The computer system of claim 8, wherein the program instructions to determine the plurality of pollution score values comprise program instructions to determine a pollution score value for at least one transportation mode.

13. The computer system of claim 8, wherein the program instructions to determine the cumulative score value comprise program instructions to determine a weighted average of all pollution score values corresponding to the one of the plurality of navigation routes.

14. The computer system of claim 8, further comprising program instructions to display the data describing the plurality of navigation routes between the origin and the destination and the corresponding plurality of pollution score values and cumulative score values.

15. A computer program product for recommending a route, the computer program product comprising one or more computer-readable non-transitory storage devices and program instructions stored on at least one of the one or more computer-readable non-transitory storage devices, the program instructions comprising:

program instructions to receive an indication of an origin and a destination;

program instructions to receive data describing a plurality of navigation routes between the origin and the destination;

program instructions to receive a plurality of pollution criteria including a plurality of pollution types;

program instruction to determine a pollution score value for each of the pollution types based on pollution sensor data, program instructions to determine a plurality of the pollution score values corresponding to each of the plurality of navigation routes;

program instructions to determine a cumulative score value for each of the plurality of navigation routes, the cumulative score values including the pollution score values for each of the plurality of pollution types; and program instructions to transmit the data describing the plurality of navigation routes between the origin and the destination and the corresponding plurality of pollution score values and cumulative score values.

16. The computer program product of claim 15, wherein the data describing the plurality of navigation routes comprises a list identifying a plurality of route segment data entities.

17. The computer program product of claim 15, further comprising program instructions to receive user preference information, wherein the received user preference information comprises a plurality of pollution criteria.

18. The computer program product of claim 17, wherein the program instructions to determine the plurality of pollution score values comprise program instructions to determine a pollution score value for at least one predetermined pollution criterion.

19. The computer program product of claim 15, wherein the program instructions to determine the plurality of pollution score values comprise program instructions to determine a pollution score value for at least one transportation mode.

20. The computer program product of claim 15, wherein the program instructions to determine the cumulative score value comprise program instructions to determine a weighted average of all pollution score values corresponding to the one of the plurality of navigation routes.

* * * * *